Dec. 12, 1967  S. W. BRIGGS  3,357,203
ABSORPTION REFRIGERATION SYSTEM
Filed June 10, 1966  2 Sheets-Sheet 1

INVENTOR
Stanford W. Briggs
BY
Hofgren, Wagner, Allen, Stellman & Cord
ATTORNEYS

United States Patent Office 3,357,203
Patented Dec. 12, 1967

3,357,203
ABSORPTION REFRIGERATION SYSTEM
Stanford W. Briggs, West Lafayette, Ind., assignor to Whirlpool Corporation, a corporation of Delaware
Filed June 10, 1966, Ser. No. 556,755
7 Claims. (Cl. 62—489)

ABSTRACT OF THE DISCLOSURE

A two-pressure absorption refrigeration system including a heated generator for driving refrigerant from a strong solution thereof in which a supply of liquid containing a large amount of dissolved refrigerant is maintained exteriorly of the generator but is transferred immediately to the generator on start-up after a shut-down period in order that the required high pressure on the generator high pressure side of the system may be achieved almost immediately.

---

This invention relates to a two-pressure absorption refrigeration system subject to operating and shut-down periods.

In a two-pressure absorption refrigeration system there is provided a generator on the high pressure side of the system in which absorption liquid rich in dissolved refrigerant is heated to generate refrigerant vapors. These vapors create a high pressure in the generator because of the nature of the refrigerant. This vapor pressure of the refrigerant in the generator is used to force the resulting weak liquid into the absorber portion of the system which is on the low pressure side.

It has been noted that when such an absorption refrigeration system is subject to operating periods alternating with shut-down periods the absorption liquid often becomes deficient in dissolved refrigerant in the generator during the shut-down periods. This can be caused by a number of factors. One of the most common causes is the slow driving off of the dissolved refrigerant by ambient heat which would be caused by a pilot light. Then, during the subsequent operating period there is insufficient dissolved refrigerant in the generator to provide a high enough vapor pressure to get the system operating again. This is true because under those conditions the liquid in the generator is substantially water and the vapor pressure of water is not sufficient to cause the system to begin operating. When this happens serious damage to the equipment may occur.

One of the features of this invention is to provide improved means for maintaining a supply of liquid rich in dissolved refrigerant in such a two-pressure absorption refrigeration system together with means for transferring this supply of rich liquid immediately to the generator upon initiating an operating period so that this rich liquid supply to the generator is immediately available to provide a high enough vapor pressure in the heat generator to start the system operating properly.

Another feature of the invention is to provide such a two-pressure absorption refrigeration system subject to operating and shut-down periods in which a generator is located on the high pressure side of the system, liquid conduit means are provided for conveying rich liquid from the low pressure side of the system to the generator during operating periods and a liquid trap means is provided in the conduit means for entrapping a supply of rich liquid during operating periods and retaining this supply during shut-down periods, together with energizable transfer means operatively associated with the conduit means for causing this conveying of rich liquid during the operating periods and for transferring the rich liquid supply to the generator on initiating the next subsequent operating period.

Other features and advantages of the invention will be apparent from the following description of one embodiment thereof taken in conjunction with the accompanying drawings. Of the drawings.

Figure 1:
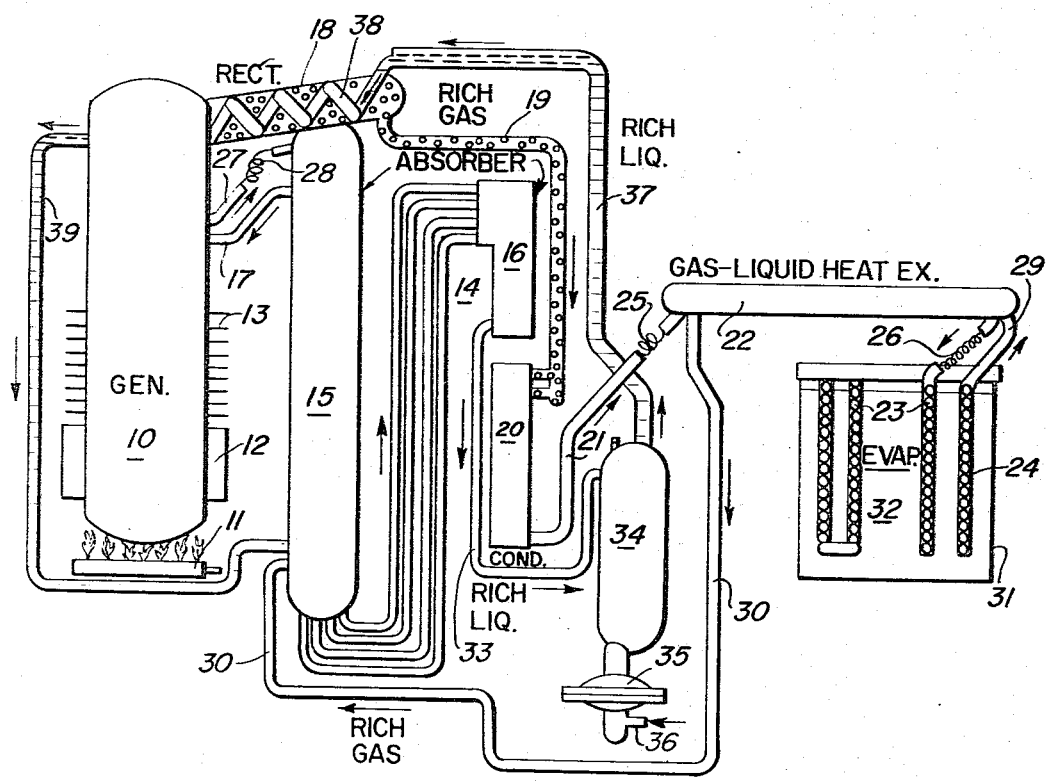
FIGURE 1 is a semi-diagrammatic side elevational view partially in section of a two-pressure absorption refrigeration system embodying the invention.
Figure 3:
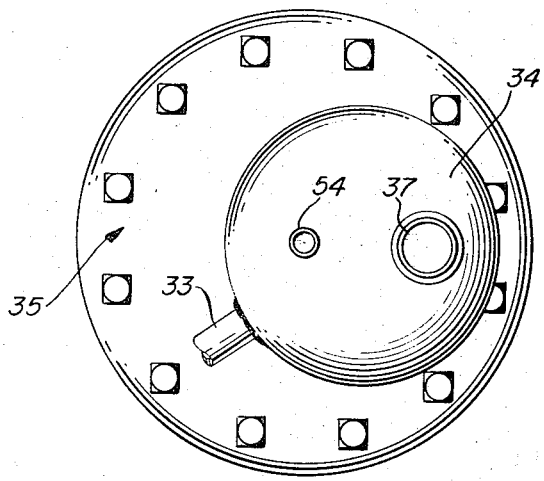
FIGURE 3 is a plan view of the reservoir.

The two-pressure absorption refrigeration system of FIGURE 1 is described in detail in the copending application of John Roeder, Jr., Ser. No. 498,235, filed Oct. 20, 1965, and assigned to the same assignee as the present application. This system, as is described therein, comprises a generator 10 which is illustrated in the form of a vertical cylinder that is heated by an annular gas burner 11 arranged beneath the bottom of the generator. The lower sides of the generator are provided with spaced vertical vanes 12 with a series of ring vanes 13 arranged thereabove.

The refrigeration apparatus also includes an absorber 14 in two parts of which one, 15, is a vertical heat exchanger and the other, 16, is a coil absorber of the type described and claimed in the copending application of E. P. Whitlow et al., Ser. No. 370,269, filed May 26, 1964, and also assigned to the same assignee as the present application.

The generator 10 is of the flooded type described and claimed in the copending application of B. A. Phillips, Ser. No. 502,186, filed Oct. 22, 1965, and also assigned to the same assignee as the present application, and when in operation is filled to slightly below an inlet pipe 17 which provides liquid rich in dissolved refrigerant from the absorber 14. In the generator 10 the dissolved refrigerant such as ammonia from the water solution thereof is boiled off and rises to the top of the generator as a gas which flows outwardly through a top upwardly and outwardly extending conduit 18 which also functions as a reflux condenser or rectifier.

This vaporized refrigerant or rich gas flows through a pipe 19 to a condenser 20 where the gaseous refrigerant is converted to liquid refrigerant which thereupon flows outwardly through a pipe 21 to a heat exchanger 22 and then to the coils 23 of an evaporator 24.

The generator 10, rectifier 18 and condenser 20 are on the high pressure side of the system. The absorber 14 and the evaporator 24 are on the low pressure side of the system. In order to maintain these pressure differences the liquid refrigerant from the condenser 20 flowing through the pipe 21 is forced through a capillary 25 or other flow restrictor and then through a second capillary 26 to the evaporator 24.

After the heat from the burner 11 has driven the rich gaseous refrigerant from the absorption liquid in the generator 10 the resulting liquid in the generator is a weak liquid or one that is weak in dissolved refrigerant. This weak liquid by the internal high vapor pressure of the vaporized refrigerant in the generator 10 is forced through a pipe 27 and a flow restrictor 28 into the one absorber part 15 of the absorber 14. This flow restrictor 28, like the others, separates the high pressure side generator 10 from the low pressure side absorber 14. In the absorber 14 the weak liquid developed in the generator 10 is contacted with rich gas from the evaporator 24 so as to be converted to rich liquid in the absorber so that the rich liquid can be conveyed back to the generator through the pipe 17, as previously described, for again generating rich gas.

In the evaporator 24 the liquid refrigerant evaporates and becomes gaseous refrigerant to produce the refrigerating effect. This gaseous refrigerant then flows from the evaporator 24 by way of a pipe 29 and the heat exchanger 22 through a pipe 30 to the absorber 14. In the absorber this gaseous refrigerant is contacted with weak liquid from the generator 10 by way of the pipe 27 to convert the weak liquid into rich liquid which, as described, is then directed back to the generator 10.

The refrigeration system shown in FIGURE 1 is designed for air conditioning. Thus, the evaporator 24 is in a tank 31 containing a surrounding liquid 32 such as water plus an antifreeze material and this liquid is then circulated in the customary manner to desired locations to provide cooling effects at these locations.

In the heat exchanger 22 liquid refrigerant from the pipe 21 flowing to the evaporator is in heat interchange relationship with gaseous refrigerant flowing from the evaporator 24.

The rich liquid from the absorber 14 is directed through a pipe 33 into a reservoir 34, to be described in greater detail hereinafter, which is on the low pressure side of the system as it is connected directly to the absorber 14. Liquid from the reservoir 34 is pumped by means of a pump 35 into the high pressure side of the system. The pump 35 is a customary diaphragm type, also to be described in greater detail hereinafter, that is operated by hydraulic fluid supplied through a line 36.

The pump 35 draws rich liquid from the reservoir 34 and forces it under pressure through a rich liquid pipe 37 into and through a helical coil 38 located within the rectifier 18 so that the rich liquid is preheated by heat transfer contact with the hot refrigerant gas flowing through the rectifier 18 from the generator 10. The helical coil 38 is in communication with a pipe 39 which directs the rich liquid into the generator 10 by way of the absorber part 15 and pipe 17 leading to the generator. In the absorber part 15, as shown and described in detail in the above Roeder application, the rich liquid pipe 39 is arranged in heat transfer contact with the weak liquid flowing from the generator through the pipe 27 and gaseous refrigerant, which are also in contact with each other, so that the weak liquid can absorb the refrigerant gas and the heat of absorption can be utilized.

As can be seen therefore the absorption refrigeration system is a two-pressure system with the high pressure side of the generator and the condenser being separated from the low pressure side that includes the absorber and the evaporator by the flow restrictors previously described. In order to transfer liquid from the low pressure side to the high pressure side of the system the pump 35 is arranged to pump rich liquid from the absorber line 33 to the generator through lines 37, 38 and 39.

In a two-pressure system of this type, and particularly one subjected to operating and shut-down periods such as in the illustrated central air conditioning system, it often happens that too much refrigerant is removed from the generator and associated parts of the system during long periods of shut-down. This can be caused by a number of reasons, one of which is that the pilot light which is used to ignite the burner 11 in the customary manner when the system begins to operate generates enough heat during non-operating periods to drive dissolved refrigerant from the absorption liquid in the generator. Then, on subsequent start-up, there is insufficient refrigerant in the generator or in the liquid pumped into the generator to provide enough pressure to get the system started by causing flow of weak liquid through the capillary 28 into the absorber 14. The vapor pressure of water alone is not sufficient to start this flow, and there is insufficient high pressure volatile refrigerant to start it. In such circumstances, the equipment will not begin to function, and there is great danger of it being damaged.

In the system of the present invention there is provided a reserve supply of rich liquid in the low pressure rich liquid portion of the system so that on start-up this supply is immediately pumped into the generator so that start-up is normal. Once the system begins operating in a normal way it will continue to do so. This reserve supply is provided by the reservoir 34 portion of the system which is illustrated in detail in FIGURE 2.

The reservoir 34 includes on its interior a liquid trap means including a trap chamber 40 arranged to receive rich liquid from the pipe 33 which leads from the absorber 14, as shown in FIGURE 1. During operation of the absorption refrigeration system the rich liquid keeps the chamber 40 substantially filled, with excess liquid flowing over the top of a dam or overflow means 41 into an annular chamber 42 that surrounds an outlet pipe 43. The bottom of the annular chamber 42 communicates at the bottom opening 44 with an auxiliary chamber 45. This auxiliary chamber 45 which is separated from the higher main chamber by an intermediate wall 46 communicates with the bottom of a vertical conduit 47 by way of a check valve 48 which permits flow only upwardly into the conduit 37. Mounted on the bottom of this conduit 47 prior to the check valve 48 is a screen 49 used to filter any solid particles from the liquid before it can reach the pump 35.

Leading laterally from the vertical conduit 47 through the auxiliary chamber 45 and into a pump chamber 60 associated with pump 35 is a generally vertical pipe 50. As the pump 35 is a diaphragm pump operated by hydraulic liquid supplied through the line 36 the conduit 47 and pipe 50 are both inlet and outlet pipes. Thus, on one stroke of the pump 35 rich liquid is drawn from the chamber 45 through the screen 49 and check valve 48 into the pipe 50 and into the pump 35 via chamber 60. Then, on the reverse stroke of the pump 35, this liquid is forced upwardly through the pipe 50 and conduit 47 and through a second check valve 51 into the bottom of the vertical outlet pipe 43. Thus, the two check valves 48 and 51 permit flow of the liquid only in a vertical direction as indicated by the arrows in FIGURE 2.

Located in the outlet pipe 43 is a second screen 52 which is also used to screen out foreign matter. After passing through this upper screen 52 the liquid is then forced through a third check valve 53 which likewise permits flow substantially only in a vertical direction as indicated by the arrows in FIGURE 2. The upper end of the pipe 43 beyond this uppermost check valve 53 is joined to the pipe 37 that leads to the rectifier or reflux condenser 18, as shown in FIGURE 1.

Extending upwardly from the top of the reservoir 34 is a short pipe 54 which may be used for charging the system with absorption liquid and refrigerant and which in such cases will be normally capped, as indicated at 55. If desired, the short pipe 54 may be used for a pressure relief valve (not shown).

During normal operation of the system rich liquid will enter the reservoir 34 by way of the pipe 33. This liquid will fill the trap chamber 40 and then spill over the upper edge of the wall or dam 41 into the space 42 and down through the opening 44 into the bottom chamber 45. The rich liquid will then be pumped by means of the pump 35 in a manner previously described up through the check valve 51, screen 52 and check valve 53 into the pipe 37 leading to the rectifier and to the generator 10. Thus, with this arrangement, the reservoir provides a liquid trap means embodied in the chambers 40 and 45 in the rich liquid conduit means for entrapping a supply of rich liquid during operating periods of the refrigeration system. The system also includes the pump 35 which functions as an energizable transfer means and is operatively associated with the conduit means for causing the conveying of rich liquid during the operating periods.

Figure 2:
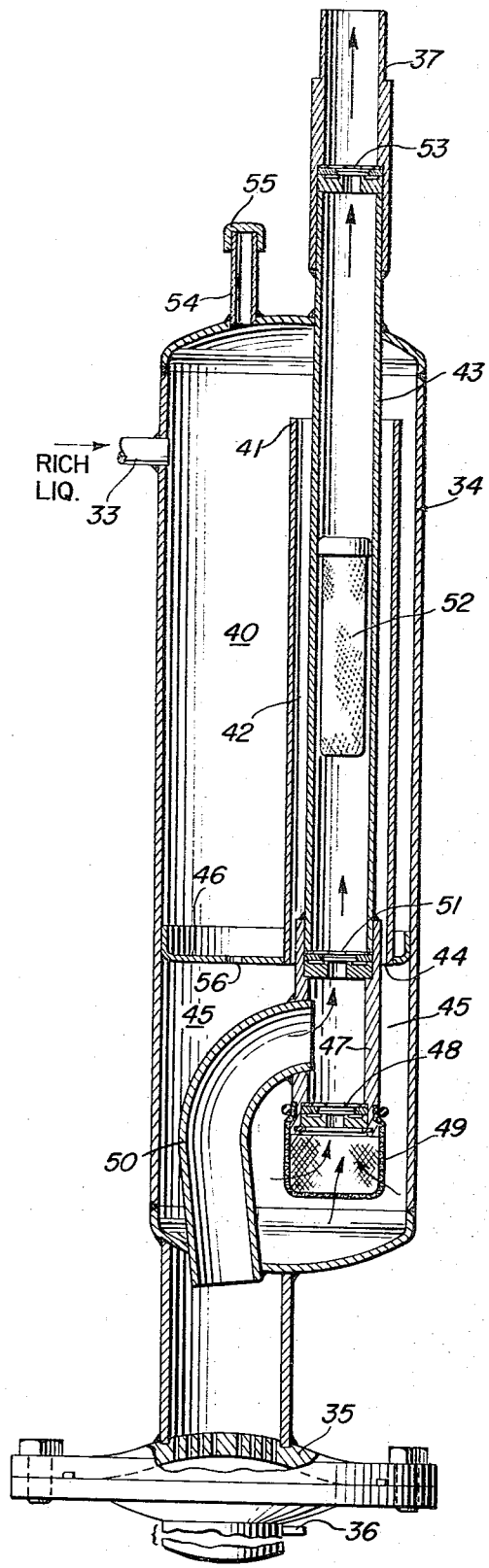
FIGURE 2 is a vertical sectional detailed view through a reservoir structure for maintaining a supply of rich liquid in the system.

The reservoir 34 includes passage means that communicate between the trap means 40 and the pump for transfer of a rich liquid supply to the pump where it will always be available for immediate transfer to the generator on initiating the next subsequent operating period after a shut-down period. In the illustrated embodiment, as shown in FIGURE 2, this passage means is shown as the small opening or orifice 56 in the bottom wall 46 that separates the chamber 40 from the lower auxiliary chamber 45. The orifice 56 is sized such that liquid flow through it is less than the liquid output of the pump during normal operations. Thus the chamber 40 will fill with liquid until liquid spills over the dam 41, and thereafter the chamber 40 will be filled with liquid during normal operations of the pump with spillage over dam 41 satisfying the pump requirements. As can be seen from FIGURE 2, the opening 56 provides for small volume flow of rich liquid into the lower chamber 45 even when the system is operating normally with the major flow of rich liquid being over the wall or dam 41.

Thus when unit operation ceases there is a volume of rich liquid retained in the chamber 40. This volume of liquid can flow through the orifice 56 into the chamber 45 until all of the space below the discharge check valve 51 is filled with rich liquid. At this time, the chamber 40 will still be approximately two-thirds full of rich liquid. Then, regardless of how long the shut-down period extends and regardless of how low the concentration of dissolved refrigerant in the generator 10 and associated parts, immediately upon initiating start-up the supply of rich liquid to the pump 35 will be supplied in the manner described for pumping into the generator 10 to supply the high pressure ammonia vapor in the generator for starting the system normally.

Because of the positioning of the trap chamber 40 and thus of the chambers 45 and 60 at the inlet to the pump 35, the supply of rich liquid during shut-down periods is on the low pressure side of the system. Also, because its location on the low pressure side of the system is so close to the inlet pump, the first few seconds of operation permits an ample supply of rich liquid to be drawn into the pump and then projected into the generator.

While the uppermost check valve 53 functions like the other check valves 48 and 51 to direct liquid flow in the proper direction, the valve 53 also aids in minimizing water hammer noises during normal operation of the system.

Having described my invention as related to the embodiment shown in the accompanying drawings, it is my intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. A two-pressure absorption refrigeration system subject to operating and shut-down periods, comprising: a generator on the high pressure side of said system in which absorption liquid rich in dissolved refrigerant is heated to generate refrigerant vapors; liquid conduit means for conveying rich liquid from the low pressure side of said system to said generator during said operating periods; liquid trap means in said conduit means exteriorly of said generator for entrapping a supply of rich liquid during said operating periods and retaining said supply exteriorly of said generator during said shut-down periods; energizable pressure applying transfer means operatively associated with said conduit means for causing said conveying during said operating periods; and passage means providing operating communication between said trap means and energizable transfer means during said shut-down periods for substantially immediate transfer of said supply to said generator on initiating the next subsequent operating period.

2. The absorption refrigeration system of claim 1 wherein flow means are provided for flowing rich liquid through said trap means to said transfer means during said operating periods.

3. The absorption refrigeration system of claim 2 wherein said passage means provides said communication during said operating periods as well as said shut-down periods.

4. The absorption refrigeration system of claim 1 wherein said trap means comprises a trap chamber for rich liquid and an overflow means leading therefrom to said transfer means operable during said operating periods and said passage means also leads from said trap chamber to said transfer means and is located at a lower level than said overflow means.

5. The absorption refrigeration system of claim 4 wherein said overflow means has a greater flow capacity than said passage means with the result that during said operating periods the major liquid flow is through said overflow means.

6. The absorption refrigeration system of claim 1 wherein said transfer means comprises a pump between said low and high pressure sides, with said liquid trap means being located adjacent the pump on said low pressure side.

7. The absorption refrigeration system of claim 1 wherein said transfer means comprises a pump between said low and high pressure sides, with said liquid trap means being located adjacent the pump on said low pressure side, said trap means comprises a trap chamber for rich liquid and an overflow means leading therefrom to said transfer means operable during said operating periods and said passage means also leads from said trap chamber to said transfer means and is located at a lower level than said overflow means, and said overflow means has a greater flow capacity than said passage means with the result that during said operating periods the major liquid flow is through said overflow means.

References Cited
UNITED STATES PATENTS

| | | | |
|---|---|---|---|
| 2,599,428 | 6/1952 | Berestneff | 62—489 |
| 3,263,437 | 8/1966 | Aronson | 62—489 |
| 3,266,266 | 8/1966 | Reid | 62—489 |

LLOYD L. KING, *Primary Examiner.*